United States Patent [19]

Girovich

[11] Patent Number: 5,215,670

[45] Date of Patent: Jun. 1, 1993

[54] PROCESS OF DRYING AND PELLETIZING SLUDGE IN INDIRECT DRYER HAVING RECYCLED SWEEP AIR

[75] Inventor: Mark J. Girovich, Baltimore, Md.

[73] Assignee: Bio Gro Systems, Inc., Annapolis, Md.

[21] Appl. No.: 801,656

[22] Filed: Dec. 2, 1991

Related U.S. Application Data

[63] Continuation-in-part of Ser. No. 484,523, Feb. 26, 1990, Pat. No. 5,069,801.

[51] Int. Cl.⁵ ............................ C02F 1/02; C02F 11/12; B01D 37/00
[52] U.S. Cl. ............................................ 210/770; 34/11; 34/12; 34/13; 34/73; 34/78; 34/79; 71/12; 71/13; 71/64.02; 209/659
[58] Field of Search ............... 210/710, 712, 713, 751, 210/769, 770, 771, 639, 767; 71/64.02, 12, 13, 25, 64.03; 34/12, 13, 79, 78, 60, 62, 73, 32, 133 R, 134, 135, 11; 209/659; 261/DIG. 9; 203/49; 422/5

[56] References Cited

U.S. PATENT DOCUMENTS

| | | | |
|---|---|---|---|
| 2,213,667 | 9/1940 | Dundas et al. | 34/11 |
| 2,772,642 | 12/1956 | Lindl | 34/62 |
| 3,728,797 | 4/1973 | Worden, Sr. et al. | 34/73 |
| 3,864,841 | 2/1975 | McGehee | 34/11 |
| 3,963,471 | 6/1976 | Hampton | 210/710 |
| 4,040,190 | 8/1977 | Van Den Broek | 34/11 |
| 4,098,006 | 7/1978 | Maffet | 34/12 |
| 4,761,893 | 8/1988 | Glorioso | 34/11 |
| 4,829,678 | 5/1989 | Glorioso | 34/11 |
| 4,852,269 | 8/1989 | Glorioso | 34/11 |
| 4,860,671 | 8/1989 | Glorioso | 34/11 |
| 4,953,478 | 9/1990 | Glorioso | 34/11 |
| 4,956,926 | 9/1990 | Glorioso | 34/11 |
| 4,974,335 | 12/1990 | Bege et al. | 34/60 |
| 4,989,344 | 2/1991 | Glorioso | 34/11 |
| 5,069,801 | 12/1991 | Girovich | 210/770 |

Primary Examiner—Robert A. Dawson
Assistant Examiner—Sun Uk Kim
Attorney, Agent, or Firm—Fay, Sharpe, Beall, Fagan, Minnich & McKee

[57] ABSTRACT

Dewatered municipal sludge is dried and simultaneously pelletized in an indirect dryer. A sweep air is introduced into the dryer to extract a water vapor and air mixture. The water vapor and air mixture is condensed and cleaned in a condensor and a scrubber to obtain a clean non-condensable gas. The non-condensable gas is heated and recycled to the dryer after heating for use as the sweep air. Since air leakage into the system is inevitable, an excess amount of air accumulates that does not need to be recycled to the dryer. The excess amount of air is diverted from the recycled sweep air and thermally treated to destroy any malodorous gaseous constituents contained therein. Preferably, the indirect dryer is a horizontal drum dryer that is heated by the hot flue gases from a combustion furnace. The condenser for condensing the water vapor and sweep air mixture extracted from the dryer is cooled by the liquid sludge entering the dewatering treatment phase of the process, and the waste flue gas from the furnace is used to heat the recycled sweep air in order to save energy by recovering waste heat of the system.

9 Claims, 2 Drawing Sheets

PROCESS OF DRYING AND PELLETIZING SLUDGE IN INDIRECT DRYER HAVING RECYCLED SWEEP AIR

This application is a continuation-in-part application of U.S. patent application Ser. No. 07/484,523, filed Feb. 26, 1990 now U.S. Pat. No. 5,069,801. The full disclosure of U.S. patent application Ser. No. 07/484,523 filed Feb. 26, 1990 is incorporated herein by reference.

BACKGROUND OF THE INVENTION

1. Field of the Invention

The invention relates to an apparatus and process for the indirect heat drying and simultaneous pelletization of dewatered sludge, such as sludge obtained from a wastewater treatment process. The mechanically dewatered sludge is thermally dried and processed to obtain sterile pellets, uniform in particle size and moisture content. Thereafter, the pellets are suitable for use as a fertilizer, an additive to a fertilizer, or as a fuel.

2. Description of Related Art

Municipal sludge is mostly a liquid containing 2 to 6% total solids. It typically contains inorganic and organic matter, nutrients such as nitrogen, phosphorous and potassium and traces of various metals. It may also contain pathogens, and, in some instances, constituents such as heavy metals and hazardous organics, depending upon the source of the raw sewage that has been treated.

In the known methods of treating municipal sludge, the sludge is treated to increase its solid content. When liquid sludge is mechanically dewatered, the dewatered sludge solids content is usually in the 15 to 30% of total solids. When the dewatered sludge is thermally dried, a product of 90 to 95% total solids is obtained.

The thermal treatment of sludge has the advantage of the greatest reduction in sludge volume (up to 98%), and also destroys or inactivates pathogenic organisms, rendering the sludge sterile. On the other hand, the thermal treatment of sludge requires special drying equipment and an energy source for generating the heat needed in drying the sludge.

Two types of sludge thermal drying are known in the treatment of municipal sludge. In the first type of system, known as direct drying, hot gas is brought into direct contact and mixed with the sludge in a chamber to vaporize water in the sludge directly. The problem with direct drying of sludge is that a large volume of malodorous gas is generated in the drying process that subsequently needs to be treated in order to remove particulate matter and to maintain an odorless treatment process.

Another known type of thermal treatment of municipal sludge uses an indirect sludge drying process wherein the sludge contacts a heated surface to vaporize the water contained therein. One known type of an indirect dryer is illustrated schematically in FIG. 2. The sludge is dried by contacting metal surfaces heated by a liquid or gaseous heating medium, such as steam, hot gas, thermal oil, etc. so that direct contact between the heating medium and the sludge is prevented. Thus, the heating medium remains clean and uncontaminated. The dryer exhaust containing water vapor and air (sweep air) which is introduced into the indirect dryer in limited quantity to facilitate transport of the water vapors is of relatively low volume. The organic matter and nutrients remain in the dried sludge product that exits the dryer. Further, the sludge is exposed to a temperature of above 100° C. for a sufficient time to inactivate or destroy any living organisms contained therein such as viruses, pathogens, etc.

SUMMARY OF THE INVENTION

An object of the present invention is to overcome the deficiencies of the known municipal sludge treatment systems by using an indirect dryer for municipal sludge that has been dewatered mechanically. The sludge is dried and simultaneously pelletized by indirect drying so that it is acceptable for use as a fertilizer in pellet form. As a result of simultaneously pelletizing the dried product to form pellets of a size that can be handled like existing fertilizer pellets, no additional pellet forming apparatus is required that would increase the cost of the system. The dried product exiting the indirect dryer contains several fractions, including pellets of a desired size, referred to as on specification (on-spec) pellets, oversized pieces of dried product that are larger than the on-spec pellets, and undersized pieces of dried product or fines that are smaller than the on-spec pellets, and which include dust. Therefore, the dried product exiting the dryer is classified to separate the pellets from the over and undersized fractions.

It is yet another object of the invention to operate an indirect dryer by recycling the fines obtained in the post-drying screening step to the inlet of the dryer for mixing them with the dewatered sludge. Further, in order to ensure an adequate supply of recycled fines, the oversized dried product is preferably crumbled (reduced in size) to obtain additional fines that are subsequently mixed with the dewatered sludge before it is fed into the dryer.

The dryer feed is preferably kept at a moisture content of between 60 to 70% solids so that a difficult to handle, glue-like sludge phase inside the dryer is avoided. The dried fines are mixed with the dewatered sludge to provide central dry nuclei that are coated by the dewatered sludge and dried to build up the nuclei layer by layer to form the pellets of a desired size, preferably 2 to 4 millimeters. As a result of the build up of the central dry nuclei obtained from the post-drying screening and crumbling processes, pellets are built up layer by layer, and are therefore dried from the inside out.

It is the object of the invention to provide an energy efficient and odorless treatment process wherein the dryer exhaust containing water vapor and sweep air contaminated with particulate matter and malodorous gaseous constituents, such as methane, high molecular weight organics and ammonia, is separately extracted from the dryer, ducted to a water vapor condenser where the water vapor is condensed and the latent energy of the water vapor condensation is recovered and used to heat the liquid sludge, which is the coolant for the water vapor condenser.

It is an object of the invention to provide an energy efficient and odorless treatment process wherein the sweep air required to facilitate water vapor transport through the indirect dryer is preheated by heat otherwise exhausted from or wasted by the system to preferably, the waste heat source is from the hot flue gas of the system's combustion furnace. Further, it is preferred that the sweep air is recycled for, preferably by cleaning the sweep air to remove particulate matter, for example by a venturi-scrubber. Further, the sweep air is preferably recycled after be cleaned and reheated to a temperature between 150° and 250° F.

It is an object of the invention to provide an odorless process wherein the sweep air is directed partially or fully into the high temperature zone of the combustion furnace for thermal destruction and deodorization.

DESCRIPTION OF THE PREFERRED EMBODIMENTS

Figure 1:
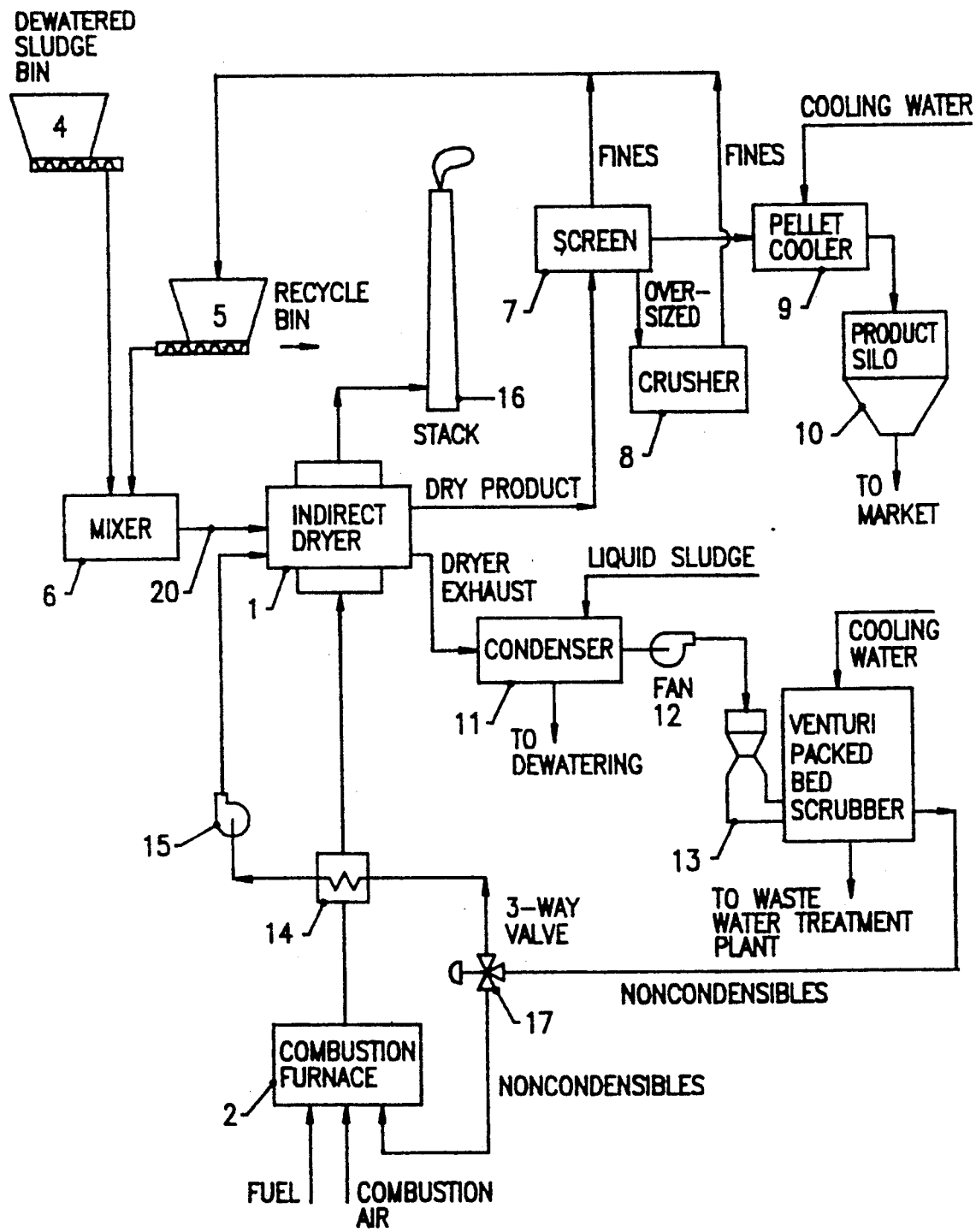
FIG. 1 is a flow chart representing various parts of the municipal sludge treating process of the invention.

The apparatus and process for indirect heat drying and simultaneous pelletization of previously dewatered sludge is shown in FIG. 1. The system is fully integrated to provide an odorless, highly energy efficient process for drying and pelletizing the dewatered sludge that produces sterile dry pellets used as a fertilizer or fuel, and wherein, the system ensures the destruction of any malodorous gases that develop.

As shown in FIG. 1, the system includes an indirect dryer 1 which is indirectly heated by the hot flue gas generated in a combustion furnace 2 by burning fossil fuel or other man-made fuels. Other suitable heating mediums for heating the dryer can also be used such as steam, for example.

Dewatered sludge (wet cake) obtained by mechanically dewatering the liquid sludge to 15 to 30% of total solids is stored in a dewatered sludge bin 4. Wet cake from the dewatered sludge bin 4 and recycled fine dried sludge from recycle bin 5 are conveyed to a mixer 6. The flow of the dried recycled fine sludge is automatically controlled in proportion to amount of dewatered sludge being fed into the mixer. The mixture 20 of the dewatered sludge and recycled fines that preferably has a total solids content in the 60 to 70% range as it enters the indirect dryer 1.

The fines that are mixed with the dewatered sludge in the mixer 6 play an important role in the simultaneous drying and pelletizing process. Each particle of the fines represents a central dry nucleus that is built up layer by layer with the dewatered sludge and dried to form the pellets of various sizes. Therefore, the direct product exiting the dryer will be in various shapes and sizes, and will include the on-spec pellets that are the desired end product of the process. Since each of the pellets is formed from a dry core, the resultant pellets have a structural stability that withstands subsequent material handling steps without excessive dust formation.

Dryer 1 preferably has a single rotating drum externally heated to a surface temperature of up to 800° F. by hot flue gas generated by the combustion furnace 2. Waste gas or electrical heating can also be used to heat the rotating drum.

Figure 2:
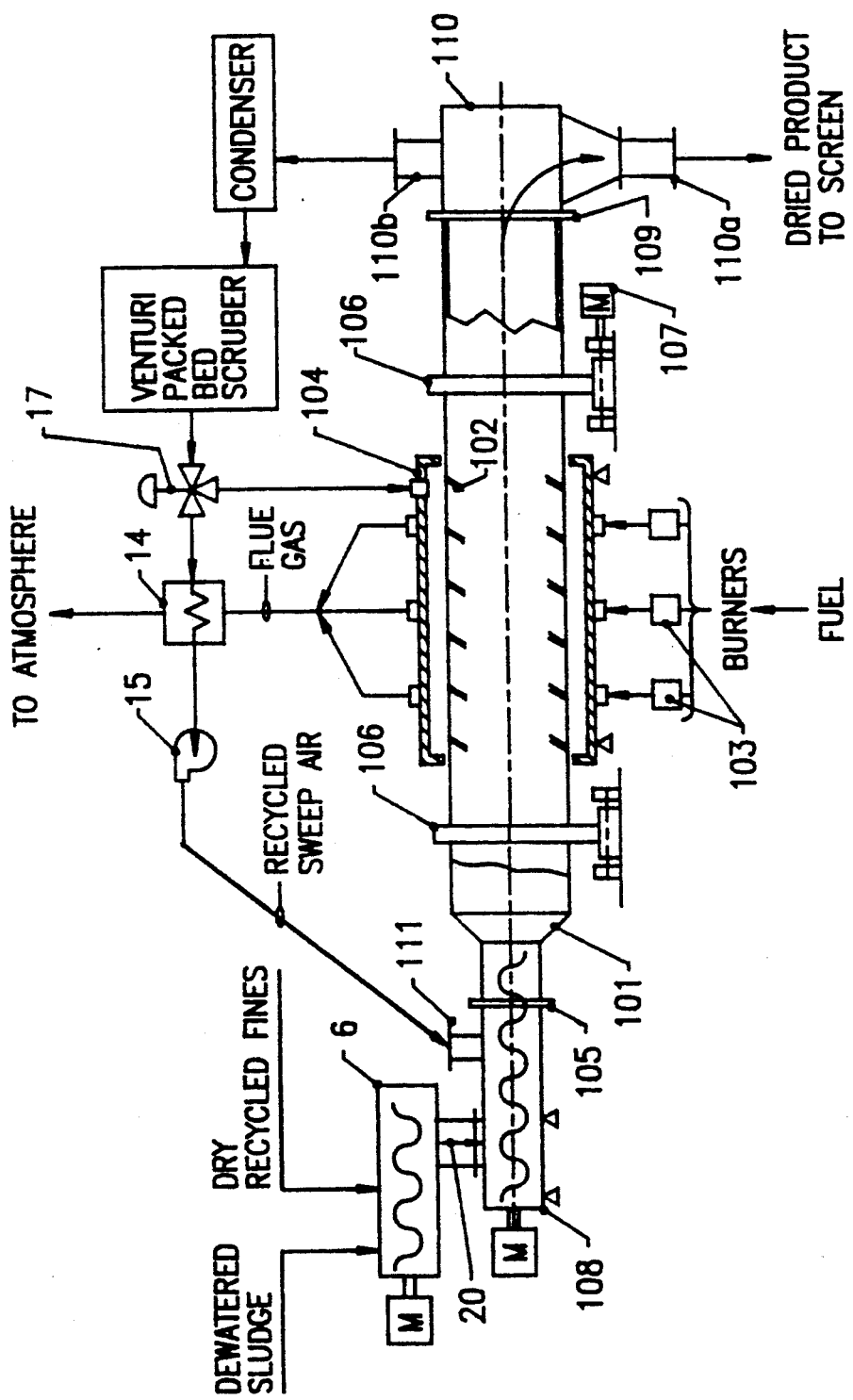
FIG. 2 is a schematic cross-sectional representation of an indirect heat dryer used in the process of the invention.

Referring to FIG. 2, the mixture 20 of wet cake and dry recycled fines enters the dryer's rotating drum 101 and travels the length of the drum while cascading an showering inside the drum. The rotating drum is equipped with flights 102 which enhance the pellets cascading and showering. The rotating drum 101 is heated by the combustion gases generated by the burners 103. Hot combustion gas travels through a stationary combustion chamber 104 and exits via a sweep air preheater 14 to the atmosphere. The rotating drum is supported by conventional bearing supports such as two tires 106. The drum is driven by a drive mechanism 107 that is also of a conventional design. The mixture 20 is fed into the rotating drum 101 from the mixer 6 via a stationary feeder 108. Air leakage into the drum 101 is prevented by two seals, 105, 109 located at the front and rear ends of the drum 101, respectively. The dried product exits the dryer via a stationary discharge hood 110 at exit 110a. The dryer exhaust is extracted separately via the discharge hood 110 through vent 110b. The non-condensable gas from the scrubber 13 (FIG. 1) is reheated in the air preheater 14 prior to recycling it to the rotating drum 101 via a sweep air inlet 111.

Referring to FIG. 1, the dried and pelletized sludge exits dryer 1 separately from the dryer's exhaust and is conveyed to a mechanical vibratory screen 7. The vibratory screen 7 preferably has two screening steps for separating the dried product from the dryer 1 into the oversized, on-spec (commercial grade) and fine fractions. The oversized fraction with sizes larger than 6 millimeters, for example, is reduced in size in a crusher 8. The commercial grade or on-spec pellets, preferably in the 2 to 6 millimeter range, are conveyed to a pellet cooler 9. The pellets are cooled, preferably using water as a coolant, and then conveyed to a pellet silo 10 for storage and subsequent distribution.

The dryer exhaust exits dryer 1 separately from the dried product and constitutes a mixture of water vapor, sweep air, fine particulate matter and gaseous components, such as methane and non-methane hydrocarbons, volatile organic matter, ammonia, hydrogen sulfide and other malodorous elements generated during the drying process. The dryer exhaust temperature is in the 220° to 250° F. range. The dryer exhaust contains a significant amount of recoverable heat energy. The dryer exhaust is pulled into a direct condenser 11 by a fan 12. Liquid sludge containing 2 to 6% total solids is sprayed into the condenser 11 to cool the dryer exhaust and to condense the water vapor contained therein. The latent energy of the water vapor condensation is recovered and used to heat the liquid sludge which is the coolant for the condenser 11.

An indirect (non-contact) condenser can also be used. The liquid sludge along with the condensed water vapor (condensate) heated preferably up to 140° to 160° F. can be used to heat sludge digesters or in the sludge dewatering process. The heated liquid sludge is dewatered more efficiently and consumes less dewatering aid (polymer) when it is heated, thus realizing significant cost savings.

After condensing the water vapor out of the dryer exhaust, the non-condensable portion of the dryer exhaust, containing mainly sweep air, is ducted into a scrubber, such as a wet venturi-packed bed scrubber 13 for further treatment. In the scrubber 13, the non-condensable gas is further cooled and cleaned from the remaining particulate matter and water vapor. Process water is used as a coolant in the venturi-scrubber 13. The cleaned and cooled non-condensable gas is then directed via a three-way valve 17 into a sweep air preheater 14 where its temperature is raised up to 200° to 250° F. using waste heat, such as the waste heat of the flue gas exiting the combustion furnace 2. The heated sweep air is then recycled into the indirect dryer 1 by a sweep air fan 15.

As a result of the above-mentioned dryer exhaust gas treatment, the sweep air is completely recirculated and significant energy is accomplished as compared with an inefficient once-through passage of sweep air.

Due to an unavoidable ambient air leakage into the dryer and other components of the system, the amount of sweep air subject to recycling will increase above a preset amount. In this case, a certain portion of the sweep air is automatically directed into the combustion furnace 2 via a three-way valve 17 for thermal desctruction prior to its release into the atmosphere.

As a result of the sweep air recirculation, the combustion furnace's flue gas is not contaminated with the particulate matter and malodorous gases which provides for a high level of environmental protection.

While there have been described and illustrated several specific embodiments of the invention, it should be clear that variation on specific details may be made without departing from the scope and spirit of the invention in the following claims.

What is claimed is:

1. A process for treating liquid sludge obtained from a waste water treatment plant, comprising:
producing an organic fertilizer product by following the steps of: dewatering the liquid sludge to obtain a dewatered sludge product, mixing dry fines in a predetermined amount as nuclei for pellets into the dewatered sludge to produce a mixture, inputting the mixture into a dryer performing indirect heat drying and simultaneous pelletizing of the mixture by coating the nuclei with the dewatered sludge during said mixing and drying to build up the pellets layer by layer to a predetermined size, supplying sweep-air to the dryer for removing an air and water vapor mixture produced by the drying, extracting the dried sludge and the air and water vapor mixture from the dryer separately from one another, classifying the dried product extracted from the dryer into oversized, on-spec and fines fractions, wherein the oversized and fines fractions are greater than and smaller than the on-spec fractions respectively, crumbling the oversized fraction to a smaller predetermined size, recycling and using the fines and crumbled fractions as said dry fines in said mixing step, and maintaining a negative pressure in the dryer for preventing the escape of malodorous gases from the dryer, condensing the air and water vapor mixture extracted from the dryer to obtain non-condensable air, wet-scrubbing the non-condensable air to remove airborne particulate matter and recycling the non-condensable air to the dryer as said sweep air.

2. A process according to claim 1, including heating said dryer with a hot flue gas from a combustion furnace, and conveying an excess portion of the wet-scrubbed non-condensable sweep air to the combustion zone of the furnace for thermally destroying malodorous gas elements contained therein.

3. A process according to claim 1, further including heating said non-condensable air in said recycling step to supply heated sweep air in said supplying step.

4. A process according to claim 2, further including heating said non-condensable air in said recycling step with waste heat from the hot flue gas.

5. A process according to claim 1, further including cooling the on-spec pellets with cooling water prior to storing the pellets.

6. A process for treating liquid sludge obtained from a waste water treatment plant, comprising the steps of:
dewatering the liquid sludge to obtain a dewatered sludge product, mixing a pellet forming nuclei substance into the dewatered sludge to produce a mixture, inputting the mixture into a dryer that performs indirect heat drying and simultaneous pelletizing of the mixture by coating the nuclei with the dewatered sludge during mixing and drying to build up the pellets layer by layer to a predetermined size;
supplying sweep-air to the dryer for removing an air and water vapor mixture from the dryer;
extracting a dried product and the air and water vapor mixture from the dryer separately from one another;
cleaning and condensing the air and water vapor mixture to obtain a noncondensible gas;
recycling the noncondensible gas to the dryer for use as said sweep air;
classifying the product exiting the dryer into on-spec and fines fractions, wherein the fines fraction is smaller in size than the on-spec fraction; and
recycling the fines fraction for use in said mixing step, wherein said pellet forming nuclei substance consists essentially of the fines fraction.

7. A process according to claim 6, including heating a drum of said dryer with a hot flue gas from a combustion furnace, and conveying an excess portion of the non-condensable gas to the combustion zone of the furnace for thermally destroying malodorous gas elements contained therein.

8. A process according to claim 6, further including cooling the on-spec fraction with cooling water prior to storing.

9. A process according to claim 6, further including conveying said non-condensable gas through a three way valve in said recycling step and diverting an excess portion of said non-condensable gas through the valve to the combustion zone of the furnace for thermally destroying malodorous gas elements contained therein.

* * * * *